(12) United States Patent
Li et al.

(10) Patent No.: US 8,179,126 B2
(45) Date of Patent: May 15, 2012

(54) HALL ROTARY TRANSFORMER AND HALL ROTATION ANGLE ENCODER MADE OF IT

(75) Inventors: Tiecai Li, Shenzhen (CN); Zhaoyong Zhou, Shenzhen (CN); Yamei Qi, Shenzhen (CN); Yajing Liu, Shenzhen (CN); Pinghua Tang, Shenzhen (CN); Guijie Yang, Shenzhen (CN); Jianyong Su, Shenzhen (CN); Zhiguo Wang, Shenzhen (CN); Weilong Lan, Shenzhen (CN); Zhihui Liao, Shenzhen (CN)

(73) Assignee: Shenzhen Academy of Aerospace Technology, Nanshan District, Shenzhen, Guangdong (CN)

( * ) Notice: Subject to any disclaimer, the term of this patent is extended or adjusted under 35 U.S.C. 154(b) by 0 days.

(21) Appl. No.: 13/142,854

(22) PCT Filed: Dec. 30, 2008

(86) PCT No.: PCT/CN2008/073870
§ 371 (c)(1),
(2), (4) Date: Jun. 30, 2011

(87) PCT Pub. No.: WO2010/078683
PCT Pub. Date: Jul. 15, 2010

(65) Prior Publication Data
US 2011/0267041 A1 Nov. 3, 2011

(51) Int. Cl.
*G01B 7/30* (2006.01)

(52) U.S. Cl. .................................. 324/207.2; 324/207.25

(58) Field of Classification Search ............... 324/207.2, 324/207.25
See application file for complete search history.

(56) References Cited

FOREIGN PATENT DOCUMENTS
WO PCT/CN2008/073870 10/2009

*Primary Examiner* — Reena Aurora
(74) *Attorney, Agent, or Firm* — Global IP Services; Tianhua Gu

(57) ABSTRACT

A hall rotary transformer comprises a rotary transformer stator (1), linear Hall components (3), a PCB (4) and a permanent magnet magnetic ring (5). A ring shape soft iron core (2) is installed on the PCB (4). Plural grooves (8) are uniformly distributed inside the peripheral surface of the ring shape soft iron core (2) and have the same number as the linear Hall components (3). Every linear Hall component (3) is installed in its corresponding groove (8) and soldered on the PCB (4). The magnetic sensitive surface of each linear Hall component (3) is aligned with the magnetic pole surface of the permanent magnet magnetic ring (5) each other. A Hall rotation angle encoder is made of the Hall rotary transformer.

10 Claims, 3 Drawing Sheets

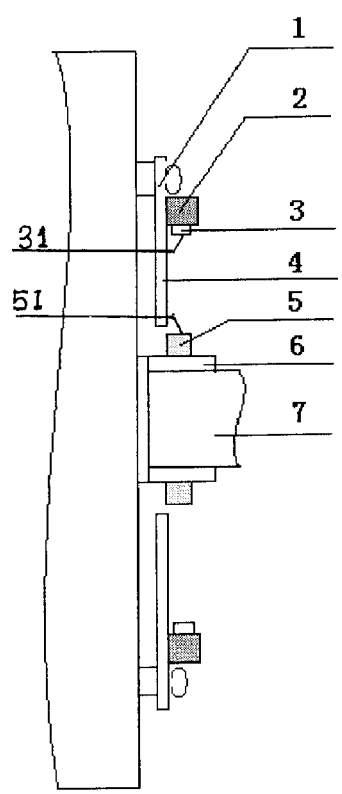 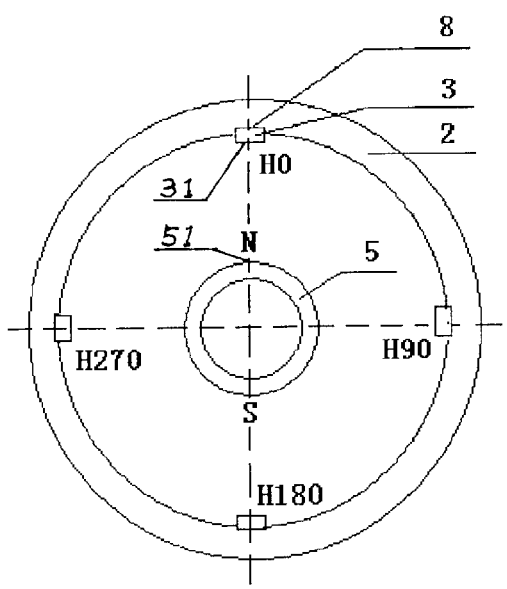
Figure 1A                                                        Figure 1B

HALL ROTARY TRANSFORMER AND HALL ROTATION ANGLE ENCODER MADE OF IT

CROSS REFERENCE TO RELATED PATENT APPLICATION

The present application is the US national stage of PCT/CN2008/073870 filed on Dec. 30, 2008, which claims the priority of the PCT/CN2008/073870 filed on Dec. 30, 2008, which application is incorporated herein by reference.

FIELD OF THE INVENTION

This invention relates to motor control technology, and more specifically, relates to a rotary transformer and Hall angle encoder made of it, which can be used for brushless DC servo motors.

BACKGROUND ART

The traditional resolver is an electromagnetic sensor, also known as synchronous resolver. It is a rotatable sensor for angle measurement, and it can be used to measure the angular displacement and the angular velocity of the shaft of rotating objects, formed by the stator and rotor. Thereof the stator windings, as primary side of the transformer, receive the exciting voltage, and the excitation frequency is usually 400, 3000 and 5000 HZ and so on. The rotor windings, as secondary side of the transformer, get induced voltage through electromagnetic coupling. Operating principle of the rotary transformer and the general transformer is similar, expect that primary and secondary windings of the general transformer are relatively fixed, so the ratio of the output voltage and input voltage is constant, while primary and secondary windings of the rotary transformer will change its relative position with the angular displacement of the rotor, so magnitude of the output voltage will change with the angular displacement of the rotor. The voltage amplitude of the output windings is in functional relationship of sine or cosine, or a proportional relationship with the rotor angle, or in linear relationship with the rotor angle in a certain scope.

The Chinese patent, CN2565123Y, published a Hall rotary transformer, compromising linear Hall components, a permanent magnet magnetic ring, a hollow shaft rotor, a stator casing, a casing rear cover, a stator core and a Hall integrated circuit PCB. Four linear Hall components are installed in the stator core, staggered 90° electrical angle, and a specific multi-pole permanent magnet magnetic ring is used, with two ball bearings in the middle of the rotor for supporting the stator, and a spring lamination in the front of the stator for connecting. The problems of this program are that (1) a specific multi-pole permanent magnet magnetic ring is needed, with high requirement of the uniformity of the magnetic poles, so it cannot be in common use of motors with different pole pair numbers; (2) within one circle, the unique zero position is different to be decided, so the absolute angular position detection is not convenient; (3) the overall structure and process is so complex that it is difficult for miniaturization.

The Chinese patent, CN200972824Y, published a improved Hall rotary transformer, compromising linear Hall components, a permanent magnet magnetic ring, a hollow shaft rotor, a stator casing, a stator core and a PCB connecting the Hall components, with the permanent magnet magnetic ring being fixed to the hallow shaft. Its significance lies in that the stator core is toroidal, with at least two mounting holes distributed at 90° space angle on the stator core. The Hall components are fixed in the mounting holes to determine the spatial location of the linear Hall components. However, due to installation gap, overall dimensions of the Hall components, and so on, there will be positional deviation of the linear Hall components in the mounting holes on the stator core in the up, down, left, right, front and back, six degree of freedom in the mounting holes. And as the permanent magnet magnetic ring is fixed on the hollow shaft, with positional deviation and vertical deviation and so on, which will cause amplitude error, phase error and function error of the output of the rotary transformer. Besides, the quality and installation of the permanent magnet magnetic ring will be greatly related to errors, so there are big errors in the traditional Hall rotary transformer and the error consistency is also poor.

If there is 0.1 mm radial position deviation in installation, supposing the external diameter of the permanent magnet is 12 mm, the relative position deviation of 0.1 mm relative perimeter is $0.1/\pi \times 12) = 0.265\%$, which is almost equal to $1°/360° = 0.278\%$, indicating that there will be 1° error even if there is one single positional deviation in this Hall rotary transformer. So the technical angle error in the Hall rotary transformer in the above program cannot be better than 1°. As another example, the permanent magnet magnetic ring is fixed to the hollow shaft, and if there is a 0.5° vertical deviation, which is equivalent to $12 \sin 0.5° = 0.1$ mm of the radial position deviation, so there will also be 1° degree of error.

The permanent magnet magnetic rings produce magnetic field of three-dimensional space, and the linear Hall components will produce voltage output in the effect of tangential magnetic-field component and radial magnetic-field component. In the Chinese patent, Bulletin No. CN200972824Y, four linear Hall components is used, and voltage output by two linear Hall components distributed in 180° is subtracted to compensate assembly eccentric of the stator and rotor. But as the radial and tangential magnetic-field component cannot be compensated at the same time, the effect of compensation is not good, which is usually mistaken for problems of uniformity of the magnetic poles.

For the reasons above, in fact, the positional deviation of the existing Hall resolver can only reach about 2°-3°, and the error consistency is poor.

The accuracy and accuracy consistency of the existing Hall resolvers are poor, and its accuracy is one order of magnitude lower than the accuracy of the traditional electromagnetic induction rotary transformer, so it can only be used in the applications of very low accuracy.

In addition, although the Switch-type Hall rotation angle encoder is already a mature technology, its accuracy and resolution are also very low, generally only 100 lines, and the accuracy in the Hall resolver in prior art is equivalent to it.

SUMMARY OF THE INVENTION

This invention intends to solve the problem of poor accuracy of the existing Hall resolver.

To solve the technological problems above, this invention provides a Hall rotary transformer, comprising a rotary transformer stator, linear Hall components, a PCB and a permanent magnet magnetic ring, wherein that a ring shape soft iron core is installed on the PCB; plural grooves are uniformly distributed inside the peripheral surface of the ring shape soft iron core and have the same number as the linear Hall components; every linear Hall component is installed in its corresponding groove and soldered on the PCB; the magnetic sensitive surface of each linear Hall component is aligned with the magnetic pole surface of the permanent magnet magnetic ring each other.

In the Hall rotary transformer of this invention, the thickness of the ring shape soft iron core can be 1-4 mm, which is made of electric iron and several dynamo steel sheets; the axial geometric center line of the ring shape soft iron core is almost aligned with the central line of the magnetic sensitive surface of the linear Hall components with deviation less than 0.5 mm.

In the Hall rotary transformer of this invention, the size of each groove on the ring shape soft iron core is just for a tight fit of one linear Hall components in to it, and the depth dimension of each groove is 0.05-0.2 mm.

In the Hall rotary transformer of this invention, the permanent magnet magnetic ring can be made of plastic bonded neodymium iron boron material, or ferrite material, or neodymium iron boron material; the permanent magnet magnetic ring has sinusoidally-distributed surface magnetic field, which is fixed to the motor shaft through the shaft sleeve, so it can produce sinusoidally-distributed air-gap magnetic field of the rotary transformer rotor when rotating; the air-gap between the stator and rotor of the rotary transformer is 5-25 mm.

In the Hall rotary transformer of this invention, the casing of the stator in the rotary transformer can be in one structure with the ring shape soft iron core, and the shaft sleeve used to install the permanent magnet magnetic ring can be fixed to the casing of the stator in the rotary transformer through the bearing.

In the Hall rotary transformer of this invention, when the number of pole pairs of the permanent magnet magnetic ring is P=1, the number of the linear Hall components is four, so correspondingly 4 grooves are distributed at 90° angle inside the peripheral surface of the ring shape soft iron core, and the ideal output of each linear Hall components are respectively $V_1=V_0+V \sin \theta$, $V_2=V_0+V \cos \theta$, $V_3=V_0-V \sin \theta$, $V_4=V_0-V \cos \theta$.

In the Hall rotary transformer of this invention, when the number of pole pairs of the permanent magnet magnetic ring is P=N, which is a natural number greater than 1, the number of the linear Hall components is three, so correspondingly three grooves are distributed at 120° electrical angle inside the peripheral surface of the ring shape soft iron core, and the ideal output of each linear Hall components are respectively $V_1=V_0+V \sin N\theta$, $V_2=V_0+V \sin N(\theta-120°)$, $V_3=V_0+V \sin N(\theta-240°)$. There can be additional three linear Hall components, so correspondingly one additional groove will be installed inside the peripheral surface of the ring shape soft iron core in the location of relative 180° with each existing groove, so there are totally six linear Hall components and six grooves, so the ideal output of the six linear Hall components are respectively $V_1=V_0+V \sin N\theta$, $V_2=V_0+V \sin N(\theta-120°)$, $V_3=V_0+V \sin N(\theta-240°)$, $V_4=V_0-V \sin N+$, $V_5=V_0-V \sin N(\theta-)120°)$, $V_6=V_0-V \sin N(\theta-240°)$.

This invention also provides a Hall rotation angle encoder, comprising rotation angle transfer circuit, as well as the Hall rotary transformer mentioned above. The rotation angle transfer circuit comprises an A/D transform module, which is used to transform analog output voltage output by the Hall rotary transformer to the digital quantity, and then get the two-phase signed digital quantity of the rotary transformer through operation; a vector rotation transfer circuit, which is used for vector rotation transform operation of output result of the A/D transform module and the feedback output signal Φ of the rotation angle encoder, to generate the output deviation signal of the vector rotation transfer circuit; a Proportional-Integral controller, which is used to make the deviation signal approach to zero, for the purpose that output signal Φ of the encoder can fully track the input rotation angle θ; a filter, which is used to get the velocity output signal ω; and a integrating circuit, which is used to get the output signal Φ of the encoder, and Φ=θ.

The Hall rotation angle encoder in this invention can be achieved by using digital signal processor DSP or MCU, or FPGA or ASIC of pure hardware.

As a result of these technical solutions, in this invention, the ring shape soft iron core corrects the wave form of the air-gap magnetic field, and the location of each Hall components can be fixed well, so the accuracy of the whole Hall rotary transformer is higher than the traditional electromagnetic induction rotary transformer. With little amplitude error, phase error and function error, it is not sensitive for installation deviation, and its consistency is good. Not only its structure and manufacturing process are simple, but also it can form rotation angle encoder of various output forms.

BRIEF DESCRIPTION OF THE DRAWINGS

FIG. 1A is the part structure diagram of the Hall rotary transformer in one embodiment of this invention;

FIG. 1B is C reference arrow view of FIG. 1A, in which some of the minor components are omitted;

In the figures, 1 is the rotary transformer stator, 2 is the ring shape soft iron core, 3 is the linear Hall component, 4 is the PCB, 5 is the permanent magnet magnetic ring, 6 is the shaft sleeve, 7 is motor shaft, 8 is small groove, and there are 4 linear Hall components H0, H90, H180, H270.

DETAIL DESCRIPTION OF THE INVENTION

This invention will be illustrated further as follows by embodiments with attached figures.

Figure 2:
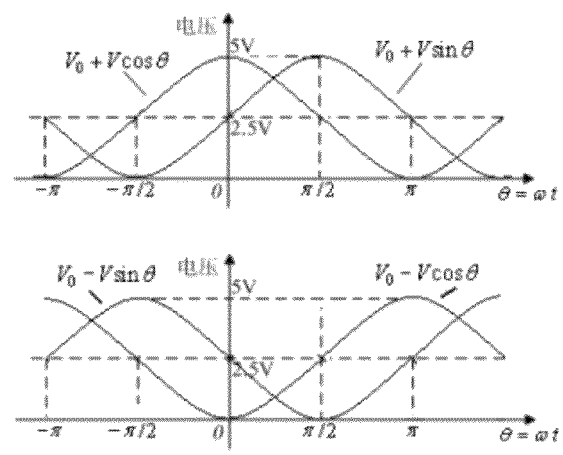
FIG. 2 is the oscillogram of analog output of four Hall components in one embodiment of this invention.

As shown in FIG. 1A and FIG. 1B, the Hall rotation transformer in this embodiment comprises a rotary transformer stator 1, linear Hall components 3, a PCB 4 connecting the Hall components and a permanent magnet magnetic ring (5) installed on the rotor shaft sleeve of the rotary transformer. Thereof, the permanent magnet magnetic ring 5 has sinusoidally-distributed surface magnetic field, which is fixed to the motor shaft 7 through the shaft sleeve 6, and the number of pole pairs is P=1, so it can produce sinusoidally-distributed air-gap magnetic field of the rotary transformer rotor when rotating. On the PCB 4, a ring shape soft iron core 2 is installed, on which there are 2p=4 small grooves 8 distributed at 90° angle, and 2p=4 linear Hall components H0, H90, H180, H270 are soldered on the PCB at 90° angle with each other, tightly fixed inside of the small grooves. The magnetic sensitive surface 31 of the linear Hall component 3 is aligned with the magnetic pole surface 51 of the permanent magnet magnetic ring 5 each other, with a uniform air-gap between stator and rotor of the rotary transformer. The ideal output of 2P=4 linear Hall components are respectively $V_1=V_0+V \sin \theta$, $V_2=V_0+V \cos \theta$, $V_3=V_0-V \sin \theta$, $V_4=V_0-V \cos \theta$. FIG. 2 is the oscillogram of analog output of four Hall components.

Thereof, by the magnet gathering effect of the ring shape soft iron core 2 installed on the PCB 4, tangential component in the rotor air-gap magnetic field produced by the permanent magnet magnetic ring 5 can be converted to the radial component. The geometry of the ring shape soft iron core decides the wave form of the air-gap magnetic field, so the orthogonality of four grooves at 90 degree angles on the ring shape soft iron core decides the orthogonality of the output signal of the linear Hall components, while it has no relationship to the soldering deviation of the linear Hall components on the PCB. The width of each small groove is just fit for the linear Hall components, so that the phase error of the Hall rotary transformer will be little. The permanent magnet magnetic ring thereof is made of plastic bonded NdFeB material.

In this embodiment, by the magnet gathering effect of the ring shape soft iron core 2, the distance between the magnetic sensitive surface of the linear Hall component and the pole surface of the permanent magnet magnetic ring 5 is made to be 15 mm. As the amplitude of the higher harmonics in the air-gap magnetic field and harmonic frequency is in high-power harmonic attenuation, the sinusoidal air-gap magnetic field has little relationship with the quality of the permanent magnet magnetic ring 5, so the function error of the Hall rotary transformer in this embodiment is little, and it has nothing to do with the axial installation dimension of the stator and the rotor.

The thickness of the ring shape soft iron core 2 thereof is 3.5 mm, made of electric iron, and the axial geometric center line of the ring shape soft iron core is almost aligned with the center line of the magnetic sensitive surface of the linear Hall components with axial installation deviation less than 0.5 mm. Thereof the air gap between the stator and the rotor of the rotary transformer can be between 5 and 25 mm, which is related to the permanent magnet magnetic ring made of different materials and the saturated magnetic density of the linear Hall components. The higher the magnetic energy of the permanent magnet magnetic ring is, the larger the air gap is. The higher the saturated magnetic density of the linear Hall components is, the larger the air gap is. It is 15 mm in this embodiment.

A rotation angle coder can be made of the Hall rotary transformer combining with the rotation angle transfer circuit. Thereof the output of the four linear Hall components is connected to the rotation angle transfer circuit, which transforms analog output voltage output by the four linear Hall components $V_1$, $V_2$, $V_3$, $V_4$ (shown in FIG. 2) to the digital quantity $D V_1$, $D V_2$, $D V_3$, $D V_4$ through A/D transform module; and then through number operation of $D \cos \theta = D V_1 - D V_3$ and $D \sin \theta = D V_2 - D V_4$, get $D \cos \theta$ and $D \sin \theta$ two-phase signed digital quantity of the rotary transformer. Because of the effect of the ring shape soft iron core and elimination of large part of tangential component in the rotor air-gap magnetic field, there will be little radial and axial installation deviation of the rotor comparing with the stator, so there will not be amplitude of $D \cos \theta$ and $D \sin \theta$ two-phase signals and phase deviation.

To illustrate the magnet gathering effect of the ring shape soft iron core, supposing the deviation of V1, V2, V3, V4 caused by radial installation deviation is $\pm \Delta V$, then $$V_1 = V_0 + (V + \Delta V) \sin \theta$$

$$V_2 = V_0 + (V + \Delta V) \cos \theta$$

$$V_3 = V_0 - (V - \Delta V) \sin \theta$$

$$V_4 = V_0 - (V - \Delta V) \cos \theta$$

$$V_1 - V_3 = 2V \sin \theta$$

$$V_2 - V_4 = 2V \cos \theta$$

Figure 3:
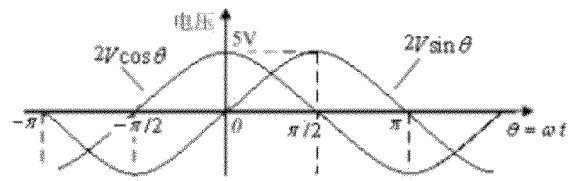
FIG. 3 is the oscillogram of analog output shown FIG. 2 after subtracting

FIG. 3 is the oscillogram of analog output of the four linear Hall components after subtracting, which have nothing to do with the installation deviation.

Figure 4:
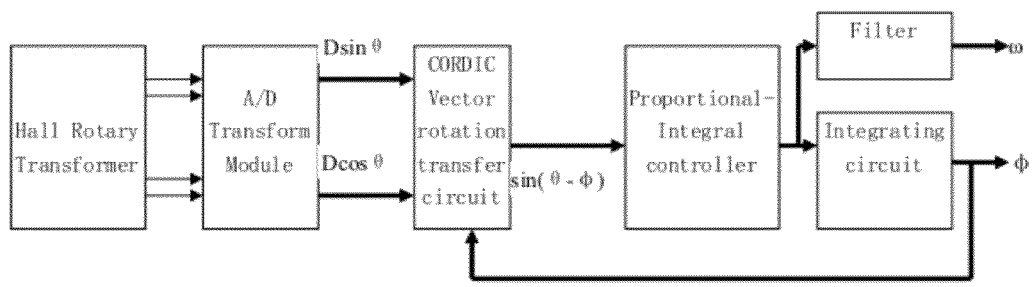
FIG. 4 is the functional block diagram of the Hall rotation angle encoder in one embodiment of this invention.
Figure 5:
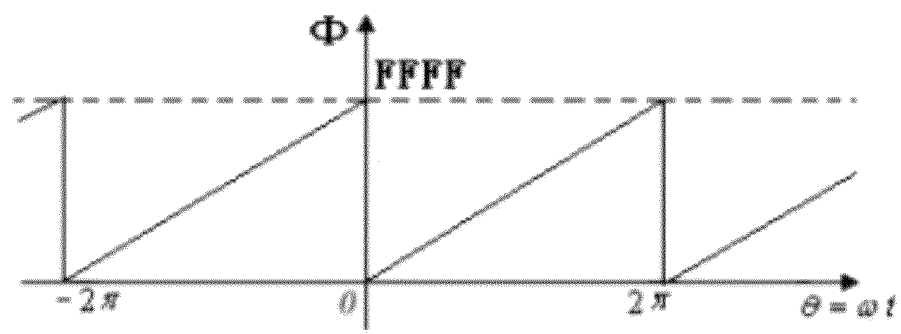
FIG. 5 is the 360° output digital quantity of the Hall rotation angle encoder shown in FIG. 4.

As shown in FIG. 4, the digital quantity of $V2-V4=2V \cos \theta$ and $V1-V3=2V \sin \theta$, and $D \cos \theta$ and $D \sin \theta$ two-phase signed digital quantity of the rotary transformer are then sent to vector rotation transform operation (CORDIC operation) circuit for vector rotation transform operation with output signal $\Phi$ of the rotation angle encoder feedback to the circuit, to get the deviation signal of output $K \sin(\theta - \phi)$ of the vector rotation transform operation; then after being sent to the Proportional-Integral (PI) controller, the deviation signal approaches to zero by the action of the controller for the purpose that output signal $\Phi$ of the encoder can fully track the input rotation angle $\theta$, and the output of the Proportional-Integral (PI) controller is in direct ratio with changes of $\theta$; then it will be sent to the filter to get the velocity output signal $\omega$; it will be also sent to the integrating circuit to get the output signal $\Phi$ of the encoder, and $\Phi = \theta$. FIG. 5 shows the relationship between 360° digital quantity signal of the Hall rotation angle encoder and 360° mechanical rotation angle.

In the Hall rotation angle encoder in this embodiment, the rotation angle transfer circuit can be achieved by using MCU with A/D module inside. The output signal $\Phi$ of the encoder got by the integrating circuit, which is a digital quantity, is output through the digital port, or by using chip selection, the signal can be output as analog quantity through D/A transfer module in the selected chip.

Thereof, the rotation angle transfer circuit can be achieved by using FPGA of pure hardware, or ASIC of pure hardware. The output signal $\Phi$ of the encoder got by the integrating circuit, which is a digital quantity, is output through the digital port, or as analog quantity through D/A transfer module in the chip.

Figure 6:
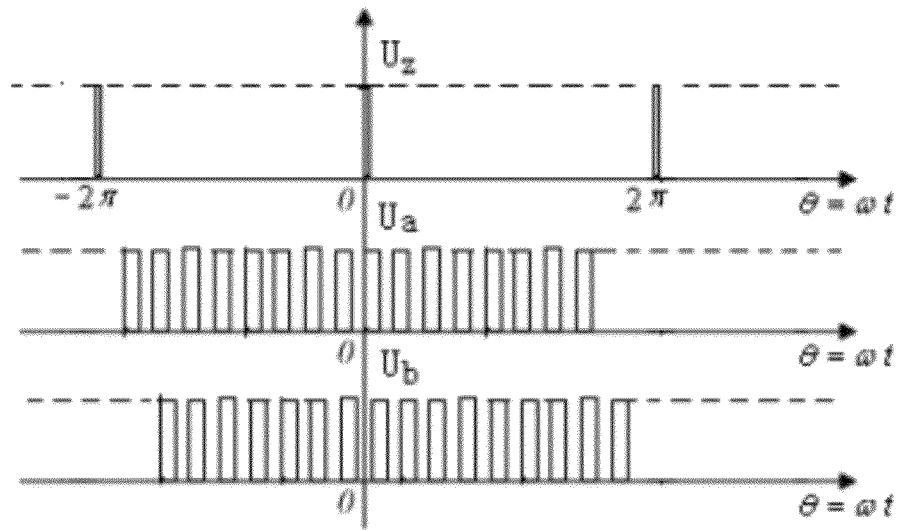
FIG. 6 is the increment pulse digital quantity of the Hall rotation angle encoder in one embodiment of this invention.

In this embodiment, the number of pole pairs of the rotor is P=1, which can detect 360° mechanical rotation angle, so it is a Hall rotary transformer and Hall rotation angle encoder with absolute value. In order to expand its application areas, information of the 360° absolute value mechanical rotation angle signal can be declined in digital way, which can be converted to rotation angle signal in form of increment and then output through digital port. FIG. 6 is the oscillogram of output signal of the increment pulse digital quantity of the Hall rotation angle encoder, in which Uz is the Z pulse signal, and Ua, Ub are a two-phase incremental pulse signals. In this embodiment, the casing of the stator in the rotary transformer is in one structure with the ring shape soft iron core 2, and the shaft sleeve 6 of the rotor in the rotary transformer used to install the permanent magnet magnetic ring 5 is fixed onto the stator casing, which forms assembled rotary transformer. The accuracy of the Hall rotary transformer in this embodiment can reach to 1-3 angle minutes, and the accuracy of the Hall rotation angle encode can reach to 1-3 angle minutes with resolution up to more than 16.

Another embodiment of this invention is a multi-pole Hall rotary transformer, the permanent magnet magnetic ring 5 thereof has sinusoidally-distributed surface magnetic field, and it is a 8-pole Hall rotary transformer as the pole pair number is P=N=4. The permanent magnet magnetic ring is fixed to the motor shaft through the shaft sleeve, so it can produce sinusoidally-distributed air-gap magnetic field of the rotary transformer rotor when rotating. On the PCB, a ring shape soft iron core is installed, on which there are three small grooves distributed at 120° electric angle to each other, and three linear Hall components are soldered on the PCB at 120° angle to each other, tightly fixed inside of the small grooves. The magnetic sensitive surface of the linear Hall component is aligned with the magnetic pole surface of the permanent magnet magnetic ring each other, with a uniform air-gap between stator and rotor of the rotary transformer. The ideal output of three linear Hall components are respectively $V_1=V_0+V \sin \theta$, $V_2=V_0+V \sin N (\theta-120°)$, $V_3=V_0+V \sin N (\theta-240°)$.

To compensate the influence on the output as there is little radial and axial installation deviation of the rotor comparing with the stator, there are three additional small grooves in the location of relative 180° mechanical angle with three existing grooves inside the ring shape soft iron core, so correspondingly there are three additional linear Hall components, so the ideal output of the six linear Hall components are respectively $V_1=V_0+V \sin N\theta$, $V_2=V_0+V \sin N (\theta-120°)$, $V3=V_0+V \sin N (\theta-240°)$, $V_4=V_0-V \sin N\theta$, $V_5=V_0-V \sin N (\theta-120°)$, $V_6=V_0-V \sin N (\theta-240°)$. The accuracy of the multi-pole Hall rotary transformer in this embodiment can reach to 1-3 angle minutes, and the accuracy of the Hall rotation angle encode can reach to 1-3 angle minutes with resolution up to more than 16.

Another embodiment of this invention is also a multi-pole Hall rotary transformer, and the permanent magnet magnetic ring 5 thereof has sinusoidally-distributed surface magnetic field, and it is a 360-pole Hall rotary transformer as the pole pair number is P=180, so the ideal output of the six linear Hall components are respectively $V_1=V_0+V \sin N\theta$, $V_2=V_0+V \sin N (\theta-120°)$, $V_3=V_0+V \sin N (\theta-240°)$, $V_4=V_0-V \sin N\theta$, $V_5=V_0-V \sin N (\theta-120°)$, $V_6=V_0-V \sin N (\theta-240°)$. The accuracy of the Hall rotary transformer in this embodiment can reach to 1-3 angle minutes, and the accuracy of the multi-pole Hall rotation angle encode can reach to 1-3 angle minutes with resolution up to 21.

What is claimed is:

1. A Hall rotary transformer comprises a rotary transformer stator (1), linear Hall components (3), a PCB (4) and a permanent magnet magnetic ring (5), a ring shape soft iron core (2) is installed on the PCB (4), plural grooves (8) are uniformly distributed inside the peripheral surface of the ring shape soft iron core (2) and have the same number as the linear Hall components (3), every linear Hall component (3) is installed in its corresponding groove (8) and soldered on the PCB (4), the magnetic sensitive surface (31) of each linear Hall component (3) is aligned with the magnetic pole surface (51) of the permanent magnet magnetic ring (5) each other.

2. The Hall rotary transformer of claim 1, wherein said thickness of the ring shape soft iron core is 1-4 mm, which is made of electric iron and several dynamo steel sheets; the axial geometric center line of the ring shape soft iron core is almost aligned with the center line of the magnetic sensitive surface of the linear Hall components with deviation less than 0.5 mm.

3. The Hall rotary transformer of claim 2, wherein said size of each groove on the ring shape soft iron core is just for a tight fit of one linear Hall components in to it, and the depth dimension of each groove is 0.05-0.2 mm.

4. The Hall rotary transformer of claim 1, wherein said permanent magnet magnetic ring is made of plastic bonded neodymium iron boron material, or ferrite material, or neodymium iron boron material; the permanent magnet magnetic ring has sinusoidally-distributed surface magnetic field, which is fixed to the motor shaft through the shaft sleeve, so it can produce sinusoidally-distributed air-gap magnetic field of the rotary transformer rotor when rotating; the air-gap between the stator and rotor of the rotary transformer is 5-25 mm.

5. The Hall rotary transformer of claim 4, wherein said casing of the stator (1) in the rotary transformer is in one structure with the ring shape soft iron core, and the shaft sleeve used to install the permanent magnet magnetic ring can be fixed to the casing of the stator (1) in the rotary transformer through the bearing.

6. The Hall rotary transformer of claim 1, wherein said number of pole pairs of the permanent magnet magnetic ring is P=1, and the number of the linear Hall components is four, so correspondingly 4 grooves are distributed at 90° angle inside the peripheral surface of the ring shape soft iron core, and the ideal output of each linear Hall components are respectively $V_1=V_0+V \sin \theta$, $V_2=V_0+V \cos \theta$, $V_3=V_0-V \sin \theta$, $V_4=V_0-V \cos \theta$.

7. The Hall rotary transformer of claim 1, wherein said number of pole pairs of the permanent magnet magnetic ring is P=N, which is a natural number greater than 1, and the number of the linear Hall components is three, so correspondingly three grooves are distributed at 120° electrical angle inside the peripheral surface of the ring shape soft iron core, and the ideal output of each linear Hall components are respectively $V_1=V_0+V \sin N\theta$, $V_2=V_0+V \sin N (\theta-120°)$, $V_3=V_0+V \sin N (\theta-240°)$.

8. The Hall rotary transformer of claim 7, wherein there are additional three linear Hall components, so correspondingly one additional groove will be installed inside the peripheral surface of the ring shape soft iron core in the location of relative 180° with each existing groove, so there are totally six linear Hall components and six grooves, so the ideal output of the six linear Hall components are respectively $V_1=V_0+V \sin N\theta$, $V_2=V_0+V \sin N (\theta-120°)$, $V_3=V_0-V \sin N (\theta-240°)$ $V_4=V_0-V \sin N\theta$, $V_5=V_0-V \sin N (\theta-120°)$, $V_6=V_0-V \sin N (\theta-240°)$.

9. A Hall rotation angle encoder comprising rotation angle transfer circuit, wherein that it also comprises the Hall rotary transformer of claim 1, the rotation angle transfer circuit comprises an A/D transform module, which is used to transform analog output voltage output by the Hall rotary transformer to the digital quantity, and then get the two-phase signed digital quantity of the rotary transformer through operation; a vector rotation transfer circuit, which is used for vector rotation transform operation of output result of the A/D transform module and the feedback output signal Φ of the rotation angle encoder, to generate the output deviation signal of the vector rotation transfer circuit; a Proportional-Integral controller, which is used to make the deviation signal approach to zero, for the purpose that output signal Φ of the encoder can fully track the input rotation angle θ; a filter, which is used to get the velocity output signal w; and a integrating circuit, which is used to get the output signal Φ of the encoder, and Φ=θ.

10. The Hall rotation angle encoder of claim 9, wherein said rotation angle transfer circuit can be achieved by using digital signal processor DSP or MCU, or FPGA or ASIC of pure hardware.

* * * * *